2,980,715

PRODUCTION OF HYDROXYLATED HIGHER FATTY ACID ESTERS

Edward H. Sheers, Kew Gardens Hills, N.Y., and Ralph J. Chamberlain, Glenbrook, Conn., assignors to American Cyanamid Company, New York, N.Y., a corporation of Maine No Drawing. Filed Feb. 18, 1959, Ser. No. 793,976

7 Claims. (Cl. 260—406)

This invention relates to a method for the production of hydroxy derivatives of esters of higher fatty acids such as the monohydric alcohol esters of oleic, linoleic and other unsaturated fatty acids of 18 or more carbon atoms and the neutral polyhydric alcohol esters of these acids such as their triglycerides.

Higher fatty acids containing one or more hydroxy groups are used for a number of purposes, for example in grease manufacture. The monohydric and polyhydric alcohol esters of these acids are also used in the production of surface coatings, as by reaction with aminotriazine-aldehyde condensation products. It is a principal object of the present invention to provide a method for the production of hydroxylated esters of higher fatty acids, which esters may be used as such for the indicated purposes or may be saponified for the production of hydroxystearic and other hydroxylated higher fatty acids.

The process of our invention is based on the discovery that borane complexes can be formed by reacting diborane with neutral esters of unsaturated higher fatty acids without substantial polymerization and that the complexes so obtained can be hydrolyzed and oxidized to form hydroxy groups. The borane complexes are formed simply by reacting the proper quantity of diborane with the esters. The complexes contain three molecular equivalents of fatty acid radical combined with one boron atom and therefore one-sixth mol of $B_2H_6$ is needed for each double bond in the unsaturated fatty acids. Thus one-sixth of a mol of diborane is needed for each mol of methyl oleate whereas methyl linoleate would require twice as much diborane. The complexing reaction can be carried out simply by contacting the ester with diborane, but preferably an activating solvent is used in order to accelerate the speed of the reaction. Ether-type solvents such as dimethyl or diethyl ether and particularly diethylene glycol dimethyl ether are preferred; other solvents such as tetrahydrofuran may be used. Advantageously the reaction is carried out while cooling the unsaturated higher fatty acid ester in order to absorb the heat of reaction while maintaining temperatures not substantially higher than about 50°–60° C., since polymerization is encountered at higher temperatures unless the reaction is carried out at fairly high dilutions.

After the requisite quantity of diborane has been reacted at the double bonds of the higher fatty acid portion of the ester the resulting complex is hydrolyzed and oxidized. Hydrolysis is effected in the cold simply by mixing the ester-borane complex with an aqueous alkali such as a dilute solution of sodium or potassium carbonate, bicarbonate or hydroxide. Oxidation of the resulting intermediate to form hydroxy groups is carried out with a mild oxidizing agent such as hydrogen peroxide, oxygen or air. The oxidation is preferably carried out at temperatures not materially higher than about 100° C. and preferably considerably less in order to avoid decomposition of the ester. The resulting hydroxylated ester is preferably recovered by washing it with water to remove alkali and residual oxidizing agent together with solvent, if a solvent was used, followed by drying and distillation at reduced pressures.

The process of our invention may be applied with advantage to a wide variety of neutral esters of higher unsaturated fatty acids such as those containing from about 18 to 22 carbon atoms. Typical monohydric alcohol esters that may be hydroxylated are methyl oleate, methyl linoleate or the methyl esters of unsaturated higher fatty acids of 20–22 carbon atoms such as those obtained from menhaden oil, sardine oil, whale oil, herring oil and the like. Esters of these and other unsaturated higher fatty acids with other monohydric alcohols such as ethyl alcohol, propyl or isopropyl alcohol, butyl alcohol, etc., may be used instead of the methyl esters if desired. Neutral esters of polyhydric alcohols such as ethylene or propylene glycol, glycerol and the like with the above described and other unsaturated higher fatty acids may be hydroxylated by the process of the invention as described above. Thus, natural triglyceride fats and oils having low acid numbers may be treated such as cottonseed oil, peanut oil, olive oil, linseed oil, soya oil, fish oils and the like.

The process of our invention will be further described and illustrated by the following specific examples to which, however, it is not limited.

EXAMPLE 1

*Hydroxylation of the ester of tung oil fatty acids*

Diborane gas was bubbled through 50 grams of the methyl ester of tung oil fatty acids dissolved in 75 ml. of diethylene glycol dimethyl ether. Heat was evolved and the reaction product solidified. A solution of 20 grams of sodium bicarbonate and 20 ml. of 50% hydrogen peroxide in 100 ml. of water was then added and the mixture was agitated until the borane complex was decomposed and the polyhydroxy fatty acid ester was formed. This was recovered by washing with water and drying.

A sample of the product was converted into a surface coating resin by reaction with hexamethoxymethylmelamine. A mixture of 80% by weight of the methyl hydroxyoctadecanoate and 20% by weight of hexamethoxymethylmelamine was heated on a water bath at 60° C. until a clear lacquer was formed. This was sprayed on a sheet metal test panel and baked at 300° F. for 30 minutes. It formed a clear, fairly hard film that took an impact of 28 inch-pounds on the back of the panel, which is a high degree of impact resistance.

EXAMPLE 2

*Hydroxylation of the esters of tall oil fatty acids*

Tall oil fatty acids are essentially a mixture of oleic and linoleic acids with about 2–5% of saturated fatty acid. For example a product sold commercially as "Acintol FA–2" contains 48% linoleic acid, 50% oleic acid and 2% saturated acids, most of which are probably palmitic and stearic acids.

A reaction flask was charged with a solution of 144 grams (0.5 mol) of the methyl ester of "Acintol FA–2" in 200 mol of diethylene glycol dimethyl ether. This was maintained under an atmosphere of nitrogen while diborane gas was bubbled through it for 2½ hours. During this time the ester turned dark yellow and became hot. After the hydroboration was complete a solution of 25 grams of sodium bicarbonate in 100 ml. of water was added, whereupon the mixture became almost colorless.

To the resulting alkaline reaction mixture were slowly added 100 ml. of 50% hydrogen peroxide diluted with an equal volume of water while the reaction flask was immersed in an ice bath to remove the considerable amount of heat developed. The resulting product was washed several times with water, taken up in toluene and fractionated by distillation at reduced pressure. After removing a first cut, weighing 7.9 grams, at 180°–200° C. and 10 mm. of mercury pressure a main fraction weighing 52.3 grams was taken boiling at 215°–217° C. at 5 mm. pressure and analyzing 74.14% carbon and 12.20% hydrogen. This was followed by a fraction boiling at 225°–227° C. at 5 mm. pressure which weighed 31.1 grams and contained 76.38% carbon and 12.13% hydrogen.

EXAMPLE 3

*Hydroxylation of triolein*

The principles of our invention can be applied to triglyceride fats and oils that contain unsaturated fatty acid esters, such as olive oil, peanut oil, corn oil, cottonseed oil, linseed oil, fish oils and the like, when these fats and oils have low acid numbers. This is illustrated by the hydroxylation of a typical triolein.

A solution of 88.5 grams of an olive oil having a saponification value of 190.6, an iodine number of 85 and an acid value of less than 1 in 400 grams of diethyl ether was placed in a reaction flask and agitated as an excess of diborane gas was bubbled through. The resulting slurry was hydrolyzed by agitating with 250 grams of a 10% aqueous sodium bicarbonate solution and oxidized by adding 20 ml. of 50% hydrogen peroxide. It was then washed with water and the hydroxylated triolein was recovered by drying. The product can be used as an antispattering frying fat or it can be saponified to produce hydroxystearic acids useful in grease making.

What we claim is:

1. A method of producing a hydroxylated higher fatty acid ester which comprises reacting a neutral ester of an unsaturated higher fatty acid with diborane and thereby forming a borane complex and hydrolyzing said complex by adding an aqueous alkali thereto and oxidizing said complex by bringing it into contact with a mild oxidant at a temperature below about 100° C.

2. A method of producing a hydroxylated higher fatty acid ester of a monohydric alcohol which comprises reacting a monohydric alcohol ester of an unsaturated higher fatty acid with diborane and thereby forming a borane complex and hydrolyzing said complex by adding an aqueous alkali thereto and oxidizing said complex by bringing it into contact with a mild oxidant at a temperature below about 100° C.

3. A method according to claim 2 in which the ester is an ester of an unsaturated fatty acid of 18–22 carbon atoms.

4. A method according to claim 2 in which the ester is a methyl ester.

5. A method of producing a hydroxylated higher fatty acid ester of a polyhydric alcohol which comprises reacting a neutral polyhydric alcohol ester of an unsaturated higher fatty acid with diborane and thereby forming a borane complex and hydrolyzing said complex by adding an aqueous alkali thereto and oxidizing said complex by bringing it into contact with a mild oxidant at a temperature below about 100° C.

6. A method of producing a hydroxylated higher fatty acid triglyceride which comprises reacting an unsaturated fatty acid triglyceride with diborane and thereby forming a borane complex and hydrolyzing said complex by adding an aqueous alkali thereto and oxidizing said complex by bringing it into contact with a mild oxidant at a temperature below about 100° C.

7. A method according to claim 6 in which the triglyceride is a glycerine triester of fatty acids of from 18 to 22 carbon atoms.

No references cited.